US009874479B2

(12) United States Patent
Kobayashi

(10) Patent No.: US 9,874,479 B2
(45) Date of Patent: Jan. 23, 2018

(54) TEMPERATURE DETECTION DEVICE

(71) Applicant: DENSO CORPORATION, Kariya, Aichi-pref. (JP)

(72) Inventor: Atsushi Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 14/898,970

(22) PCT Filed: Jun. 17, 2014

(86) PCT No.: PCT/JP2014/003221
§ 371 (c)(1),
(2) Date: Dec. 16, 2015

(87) PCT Pub. No.: WO2015/001737
PCT Pub. Date: Jan. 8, 2015

(65) Prior Publication Data
US 2016/0131538 A1 May 12, 2016

(30) Foreign Application Priority Data

Jul. 4, 2013 (JP) .................................. 2013-140728

(51) Int. Cl.
G01K 7/00 (2006.01)
G01K 7/16 (2006.01)
G01K 7/01 (2006.01)

(52) U.S. Cl.
CPC ................ G01K 7/16 (2013.01); G01K 7/01 (2013.01); G01K 2219/00 (2013.01)

(58) Field of Classification Search
USPC ...................... 374/183, 1, 170; 327/512, 513
See application file for complete search history.

(56) References Cited

U.S. PATENT DOCUMENTS 4,029,974 A * 6/1977 Brokaw .................... G01K 7/01
323/315
4,176,344 A * 11/1979 Saari ...................... H03M 1/747
327/512

(Continued)

FOREIGN PATENT DOCUMENTS

JP H8-029269 A 2/1996
JP H10-038964 A 2/1998

(Continued)

OTHER PUBLICATIONS

International Search Report of the International Searching Authority dated Sep. 22, 2014 for the corresponding international application No. PCT/JP2014/003221 (and English translation).

(Continued)

Primary Examiner — Mirellys Jagan
(74) Attorney, Agent, or Firm — Posz Law Group, PLC

(57) ABSTRACT

To provide a high accuracy temperature detection device, a D/A conversion circuit includes a ladder network, constant current circuits and switch circuits. A temperature sensing circuit such as a diode is kept at a threshold temperature of a protecting operation against overheating and the switch circuits are switched according to a predetermined adjustment data value such that a temperature detection voltage is in a prescribed range. Since each of the switch circuits connects between corresponding one of the constant current circuits and a common terminal while disconnecting between the corresponding one of the constant current circuits and corresponding one of current terminals, an electric current flowing to the temperature sensing circuit is constant regardless of the adjustment data value and a correction resolution of the temperature detection voltage is constant.

6 Claims, 8 Drawing Sheets

(56) References Cited

U.S. PATENT DOCUMENTS

| | | | |
|---|---|---|---|
| 5,781,141 A | 7/1998 | Ikuta et al. | |
| 6,337,603 B1 | 1/2002 | Kinugasa et al. | |
| 9,024,700 B2 * | 5/2015 | Ranta | H03J 3/20 |
| | | | 327/554 |
| 2008/0238529 A1 | 10/2008 | Kumagai | |
| 2011/0068854 A1 * | 3/2011 | Engl | G05F 3/30 |
| | | | 327/512 |
| 2011/0122917 A1 | 5/2011 | Hamanaka et al. | |
| 2013/0170520 A1 * | 7/2013 | Englasyam | G01K 7/015 |
| | | | 374/178 |

FOREIGN PATENT DOCUMENTS

| | | |
|---|---|---|
| JP | 2000-068830 A | 3/2000 |
| JP | 2002-267695 A | 9/2002 |
| JP | 2004-108987 A | 4/2004 |
| JP | 2004-260397 A | 9/2004 |
| JP | 2006-344721 A | 12/2006 |
| JP | 2011-223753 A | 11/2011 |

OTHER PUBLICATIONS

Written Opinion of the International Searching Authority dated Sep. 22, 2014 for the corresponding international application No. PCT/JP2014/003221 (and English translation).

\* cited by examiner

TEMPERATURE DETECTION DEVICE

CROSS REFERENCE TO RELATED APPLICATIONS

This application is a U.S. national stage of International Patent Application No. PCT/JP2014/003221 filed on Jun. 17, 2014 and is based on Japanese Patent Application No. 2013-140728 filed on Jul. 4, 2013, the disclosures of which are incorporated herein by reference.

TECHNICAL FIELD

The present disclosure relates to a temperature detection device that detects temperature based on an output voltage of a temperature sensing circuit.

BACKGROUND ART

A motor that generates power in, for example, a hybrid vehicle or an electric vehicle is driven with an inverter device. The inverter device includes a plurality of power semiconductor elements that are connected to each other. When the power semiconductor elements have an excessive amount of electric currents due to, for example, an increase of a load applied to a motor, there is a possibility that temperatures of the power semiconductor elements exceed an allowable temperature and lives of the power semiconductor elements are shortened. Therefore, the inverter device has a temperature detection circuit detecting the temperatures of the power semiconductor elements and performs a protecting operation that limits the electric currents based on the detected temperatures.

A temperature detection circuit described in patent literature 1 has diodes located adjacent to power semiconductor elements and detects temperatures of the power semiconductor elements based on forward voltages Vf of the diodes. As well known, the forward voltages Vf of the diodes have negative temperature coefficients.

PRIOR ART LITERATURE

Patent Literature

Patent literature 1: JP H10-38964 A

SUMMARY OF INVENTION

However, electronic components of the temperature detection circuit have different properties. In the case of the temperature detection circuit using the diodes as temperature sensitive elements, the value of the forward voltage Vf at a threshold temperature (for example, a temperature at which the protecting operation is required) is different between the temperature sensitive elements. Therefore, in the case where the protecting operation is determined to start based on a comparison between voltages outputted from the temperature sensitive elements and a reference voltage corresponding to the threshold temperature, the protecting operation will not start until the temperatures of the temperature sensitive elements exceed the threshold temperature. To address this issue, it can be considered to use power semiconductor elements having large values of allowable power dissipation considering that the temperatures of the power semiconductor elements exceed the threshold temperature. However, when such margins are secured, the size of each of the power semiconductor elements will be increased.

It is an object of the present disclosure to provide a high accuracy temperature detection device.

According to a first aspect of the present disclosure, the temperature detection device has a ladder network that includes an R-2R type resistor ladder provided between current terminals correspondingly provided for bits and a common terminal provided for the bits in common. When electric currents are inputted or outputted through the current terminals, a voltage that is obtained by weighting a bit value of each of the bits with power of two and adding the bit values weighted is generated between an output terminal of the R-2R type resistor ladder and the common terminal.

The temperature detection device has a plurality of constant current circuits that are correspondingly provided for the bits and a plurality of first switch circuits that are correspondingly provided for the bits between the constant current circuits and the current terminals of the ladder network. A temperature sensing circuit that outputs a voltage (temperature sensing voltage) based on temperature is provided between the common terminal of the ladder network and a reference voltage line having a reference potential. A voltage adjusting circuit outputs an adjustment data value that commands an on state and an off state of the first switch circuits such that a voltage (temperature detection voltage) generated between the output terminal of the ladder network and the reference voltage line when the temperature sensing circuit is at a predetermined temperature is in a prescribed voltage range.

According to the structure described above, the ladder network, the constant current circuits and the first switch circuits provide a digital-to-analog (D/A) conversion circuit. A correction voltage that is a D/A converted value of the adjustment data value is generated between the output terminal and the common terminal of the ladder network. The temperature detection voltage is a voltage obtained by adding the correction voltage to the temperature sensing voltage.

An adjustment data is prepared in advance and the voltage adjusting circuit switches the on state and the off state of the first switch circuits based on the adjustment data value to correct the temperature sensing voltage by a D/A conversion voltage. As a result, even if the voltage outputted by the temperature sensing circuit varies, the temperature detection voltage at a predetermined temperature can be adjusted to be in the prescribed voltage range and accuracy of the temperature detection device can be improved.

According to a second aspect of the present disclosure, the temperature detection device has a current compensating circuit that controls an electric current flowing to the temperature sensing circuit to be constant regardless of the adjustment data value. The temperature sensing circuit such as a diode has a characteristic of outputting a voltage that varies according to a value of the electric current flowing to the temperature sensing circuit. The ladder network inputs or outputs an electric current through the common terminal, the electric current having a current value equal to the sum of values of electric currents outputted from the constant current circuits that correspond to the bits the first switch circuits of which are on. Since the electric current flows to the temperature sensing circuit, the value of the electric current flowing to the temperature sensing circuit through the ladder network varies depending on the adjustment data value.

The current compensating circuit restricts the temperature sensing voltage from depending on the adjustment data value. The voltage adjusting circuit can adjust the correction voltage (that is, temperature detection voltage) by a correction resolution of the D/A conversion circuit at one time according to the adjustment data value. As a result, the rate of the adjustment can be restricted from varying depending on the adjustment data value and a remaining error after the adjustment of the temperature detection voltage can be decreased to be lower than the correction resolution of the D/A conversion circuit.

According to a third aspect of the present disclosure, the current compensating circuit includes a plurality of second switch circuits that are correspondingly provided for the bits. Each of the second switch circuits is turned on to connect between corresponding one of the constant current circuits and the common terminal of the ladder network while corresponding one of the first switch circuits disconnects between the corresponding one of the constant current circuits and corresponding one of the current terminals of the ladder network. Each of the second switch circuits is turned off to disconnect between corresponding one of the constant current circuits and the common terminal of the ladder network while corresponding one of the first switch circuits connects between corresponding one of the constant current circuits and corresponding one of the current terminal of the ladder network.

According to the structure described above, electric currents outputted from each of the constant current circuits of the bits flow to the temperature sensing circuit regardless of the on state and the off state of each of the first switch circuits. That is, since output currents of the constant current circuits of all of the bits flow to the temperature sensing circuit, the electric current flowing to the temperature sensing circuit is constant regardless of the adjustment data value.

According to a fourth aspect of the present disclosure, each of the first switch circuits and each of the second switch circuits are provided by an integrated switch circuit. The integrated switch circuit connects, according to a bit value of corresponding one of the bits of the adjustment data value, corresponding one of the constant current circuits to one of the corresponding one of the current terminals of the ladder network and the common terminal of the ladder network. According to the structure, the number of signal lines that are needed for controlling the first switch circuits and the second switch circuits can be decreased and an alternative switching operation can be performed accurately.

According to a fifth aspect of the present disclosure, the current compensating circuit includes a variable current source that allows an electric current to flow into the temperature sensing circuit. The electric current has a current value equal to the sum of values of electric currents outputted from the constant current circuits that correspond to the bits the first switch circuits of which are off. Electric currents outputted from the constant current circuits that correspond to the bits the first switch circuits of which are on flow to the temperature sensing circuit through the ladder network. Therefore, since output currents of the constant current circuits corresponding to all of the bits flow to the temperature sensing circuit, the electric current flowing to the temperature sensing circuit is constant regardless of the adjustment data value.

According to a sixth aspect of the present disclosure, the temperature sensing circuit includes one element or a series circuit of plural elements selected from one diode or series connected diodes each having a temperature characteristic, one resistor or series connected resistors each having a temperature characteristic, and one voltage source or series connected voltage sources each having a temperature characteristic. That is, the temperature sensing circuit can be provided by any single element of the diode, the resistor and the voltage source each having a temperature characteristic. Also, the temperature sensing circuit having an intended temperature characteristic can be provided by various combinations of the diode, the resistor and the voltage source.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

In the following embodiments, substantially same parts are designated with the same symbols and descriptions thereof will not be repeated.

First Embodiment

First embodiment will be described with reference to FIG. 1 to FIG. 7. A motor that generates power in a hybrid vehicle, an electric vehicle and the like is driven with an inverter device. The inverter device includes, for example, six Insulated Gate Bipolar Transistor (IGBT) modules 11 that are connected to form a three-phase bridge circuit.

Figure 2:
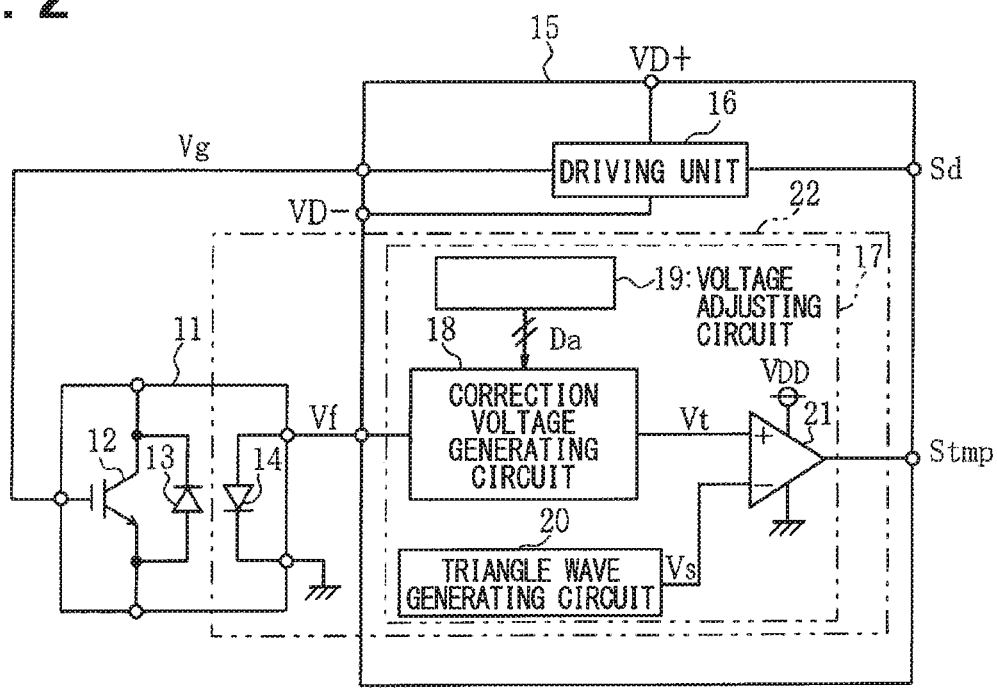
FIG. 2 is a diagram illustrating structures of an IGBT module and a drive IC.

As shown in FIG. 2, the IGBT module 11 has an IGBT 12 as a power semiconductor element, a flyback diode 13 and a diode 14 as a temperature sensing circuit. A mold package of the IGBT module 11 has terminals that are connected to a gate, a collector and an emitter of the IGBT 12 and an anode and a cathode of the diode 14. The diode 14 is thermally connected to the IGBT 12 and the diode 13. The cathode of the diode 14 is connected to the ground (reference voltage line) that has 0V (reference potential).

Drive ICs 15 are correspondingly provided for the six IGBT modules 11. Each of the drive ICs 15 has a driving unit 16 that provides a gate voltage Vg to the IGBT 12 according to a driving signal Sd received from a microcomputer (not illustrated) that controls the inverter device. The driving unit 16 receives power voltages VD+ and VD− through a pair of power terminals. The power voltages VD+ and VD− are needed to generate the gate voltage Vg.

The drive IC 15 has a detection unit 17 that receives a forward voltage Vf of the diode 13 and outputs a temperature detection signal Stmp to the microcomputer, the temperature detection signal Stmp having a duty cycle according to a detected temperature. The detection unit 17 has a correction voltage generating circuit 18, a voltage adjusting circuit 19, a triangle wave generating circuit 20 and a comparator 21. The diode 14 and the detection unit 17 provide a temperature detection device 22.

Figure 1:
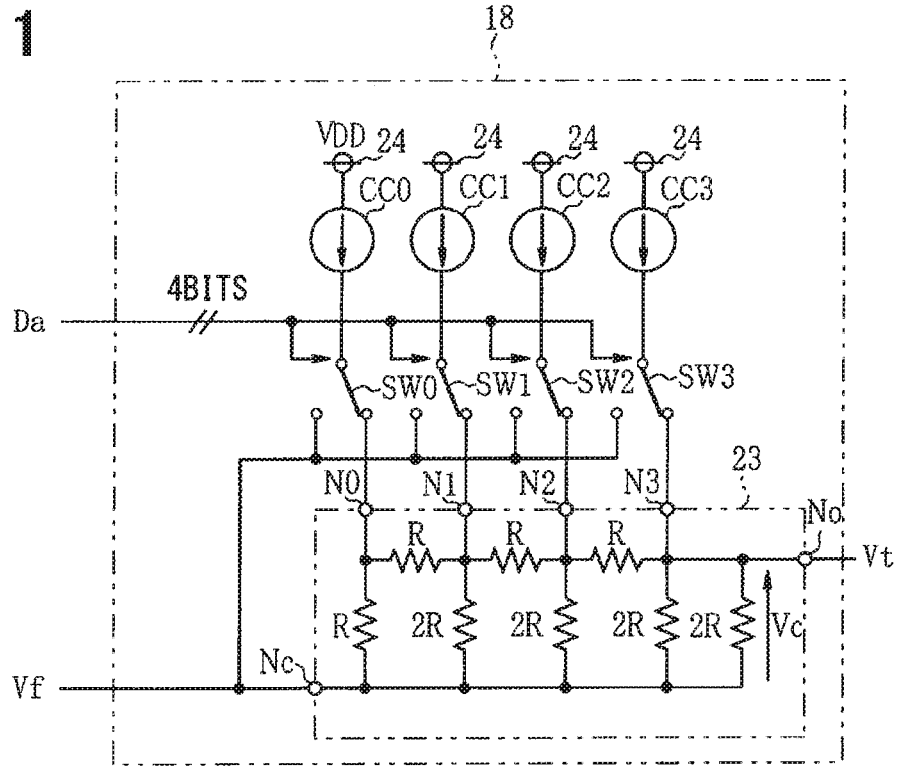
FIG. 1 is a diagram illustrating a structure of a correction voltage generating circuit of a temperature detection device according to a first embodiment of the present disclosure.

As shown in FIG. 1, the correction voltage generating voltage 18 has a ladder network 23 of a 4 bits configuration, constant current circuits CC0 to CC3 and switch circuits SW0 to SW3. The ladder network 23 has an R-2R type resistor ladder between current terminals N0 to N3 and a common terminal No. The current terminals N0 to N3 are correspondingly provided for a zero bit (Least Significant Bit, LSB) to a third bit (Most Significant Bit, MSB). The common terminal Nc is provided for the bits in common. The common terminal Nc is connected to the anode of the diode 14 integrated in the IGBT module 11.

The R-2R type resistor ladder has resistors with a resistance value R between the current terminal N0 and the common terminal Nc and between the current terminals adjacent to each other. The R-2R type resistor ladder also has resistors with a resistance value 2R between the current terminals N1 to N3 and the common terminal Nc and between an output terminal No and the common terminal Nc. The current terminal N3 is connected to the output terminal No. When the ladder network 23 receives constant currents I through the current terminals N0 to N3, a correction voltage Vc is generated between the output terminal No and the common terminal Nc. The correction voltage Vc is obtained by weighting a bit value of each of the bits, to which the constant currents I are inputted, with power of two and adding the bit values weighted.

The constant current circuits CC0 to CC3 are correspondingly provided for the bits of the ladder network 23. The constant current circuits CC0 to CC3 have one ends connected to power line 24 and output the constant currents I. The switch circuits SW0 to SW3 are correspondingly provided for the bits of the ladder network 23. The switch circuits SW0 to SW3 connect between the constant current circuits CC0 to CC3 and the current terminals N0 to N3 or between the constant current circuits CC0 to CC3 and the common terminal Nc according to respective bit values of an adjustment data value Da, which is described later.

Namely, each of the switch circuits SW0 to SW3 is an integrated circuit provided by a first switch circuit that is provided between corresponding one of the constant current circuits CC0 to CC3 and corresponding one of the current circuits N0 to N3 and a second switch circuit that is provided between the corresponding one of the constant current circuits CC0 to CC3 and the common terminal Nc. The first switch circuit is a switch circuit that generates the correction voltage Vc based on the adjustment data value Da. The second switch circuit is a current compensating circuit that controls the electric current flowing to the diode 14 to be constant regardless of the adjustment data value Da. When the first switch circuit is off, the second switch circuit is on. When the first switch circuit is on, the second switch circuit is off.

The voltage adjusting circuit 19 shown in FIG. 2 includes a non-volatile memory (for example, Erasable Programmable Read Only Memory, EPROM). The voltage adjusting circuit 19 outputs the adjustment data value Da of 4 bits to control the switch circuits SW0 to SW3. The ladder network 23 outputs a temperature detection voltage Vt from a path between the output terminal No and the ground. The temperature detection voltage Vt is obtained by adding the correction voltage ye to the forward voltage Vf of the diode 14.

The triangle wave generating circuit 20 generates a triangle wave Vs that has constant amplitude and constant frequency. The comparator 21 compares the temperature detection voltage Vt and the triangle wave voltage Vs and outputs the temperature detection signal Stmp having the duty cycle according to the temperature detection voltage Vt.

Next, operations of the present embodiment will be described with reference to FIG. 3 to FIG. 7. The microcomputer controlling the inverter device detects the temperature of the IGBT module 11 based on the temperature detection signal Stmp, and performs a protecting operation against overheating. For example, when the detected temperature is higher than a first threshold temperature, the microcomputer shifts the inverter device to a power-saving operation that limits the electric current of the IGBT 12. When the detected temperature is higher than a second threshold temperature that is higher than the first threshold temperature, the microcomputer suspends the inverter device.

As described above, the forward voltage Vf of the diode 14 is different between the power semiconductor element. Therefore, when the forward voltage Vf is used as it is, a detection error of the temperature increases. In an inspection process after a manufacturing process, the IGBT module 11 is put in a thermostat chamber and held at the first threshold temperature or the second threshold temperature. The adjustment data value Da is determined such that the temperature detection signal Stmp when the IGBT module 11 is held at the first threshold temperature or the second threshold temperature has a duty cycle within a prescribed range, and the adjustment data value Da is written in the voltage adjusting circuit 19. After the inspection process is finished, the combination of the IGBT module 11 and the drive IC 15 is retained.

The detection unit 17 adjusts the temperature detection voltage Vt by adding the correction voltage Vc to the forward voltage Vf as a principal operation. The temperature detection signal Stmp is corresponds to a signal merely obtained by converting the temperature detection voltage Vt into the duty cycle. Hereinafter, the adjusting operation of the voltage adjusting circuit 19 and the correction voltage generating circuit 18 will be described focusing on the temperature detection voltage Vt as a target to adjust.

The ladder network 23, the constant current circuits CC0 to CC3 and the switch circuits SW0 to SW3 (portions that function as the first switch circuits) provide a D/A conversion circuit of 4 bits. A resolution $\Delta V$ of the correction voltage Vc that is generated between the output terminal No and the common terminal Nc can be expressed as shown in formula (1). n represents the number of bits of the ladder network 23 (in this case, four).

Correction resolution $\Delta V=I/3\times(½^{n-2})\times R$ (1)

When the adjustment data value Da is represented as (D3 D2 D1 D0), the correction voltage Vc that is a D/A converted value of the adjustment data value Da can be expressed as shown in formula (2).

Correction voltage $Vc=\Delta V\times(2^3\cdot D3+2^2\cdot D2+2\cdot D1+D0)$ (2)

Figure 3:
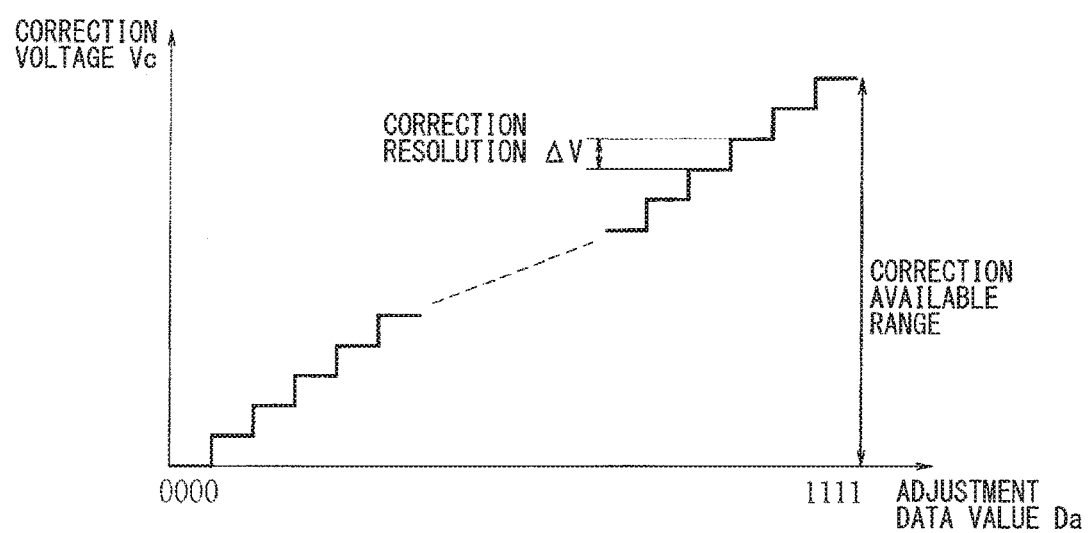
FIG. 3 is a characteristic diagram of D/A conversion.

FIG. 3 illustrates a relation of the adjustment data value Da and the correction voltage Vc. The correction voltage Vc has a range from 0V to $\Delta V\times(2^n-1)$. As a result, the temperature detection voltage Vt can be generated between the output terminal No of the ladder network 23 and the ground. The temperature detection voltage Vt is obtained by adding the correction voltage Vc to the forward voltage Vf. The temperature detection voltage Vt can be adjusted to be in a prescribed voltage range by changing the adjustment data value Da. In this case, as the correction resolution $\Delta V$ is small, the forward voltage Vf can be more accurately adjusted, and a temperature detection accuracy using the temperature detection voltage Vt can be improved.

Figure 4:
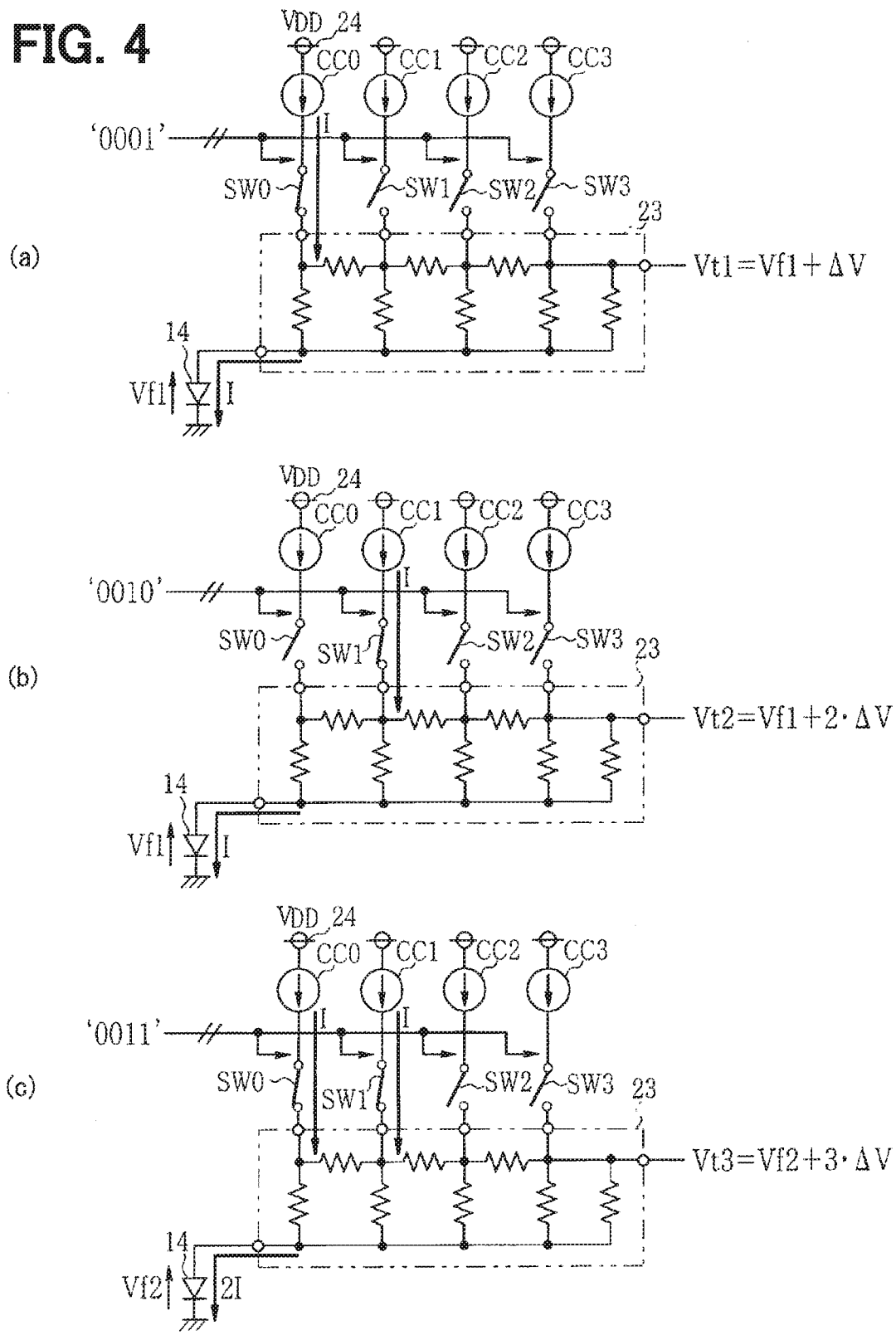
FIG. 4 is a diagram illustrating current paths in structures without second switch circuits.

Since the switch circuits SW0 to SW3 can function as the second switch circuits, detection accuracy of the temperature detection voltage Vt can be further improved. Hereinafter, the operations will be described. In FIG. 4, (a) to (c) illustrate current paths in structures without the second switch circuits when the adjustment data value Da is 0001, 0010 and 0011, respectively.

In the case of (a) of FIG. 4, an electric current of I flows from the constant current circuit CC0 to the diode 14 through the ladder network 23. Also in the case of (b) of FIG. 4, the electric current of I flows. In the case of (c) of FIG. 4, the electric current of 2I flows from the constant current circuits CC0, CC1 to the diode 14 through the ladder network 23. That is, in the structure without the second switch circuits, which are the current compensating circuits, the value of the electric current flowing to the diode 14 changes according to the adjustment data value Da.

Figure 5:
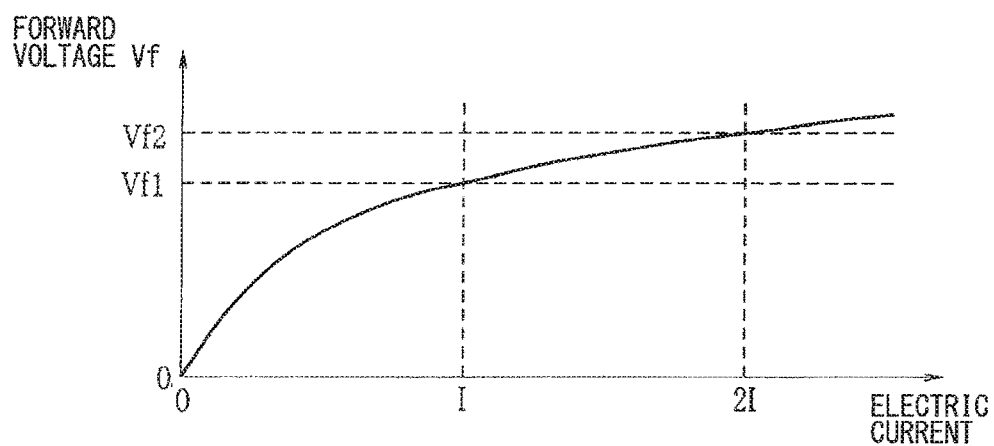
FIG. 5 is a forward direction characteristic diagram of a diode.
Figure 6:
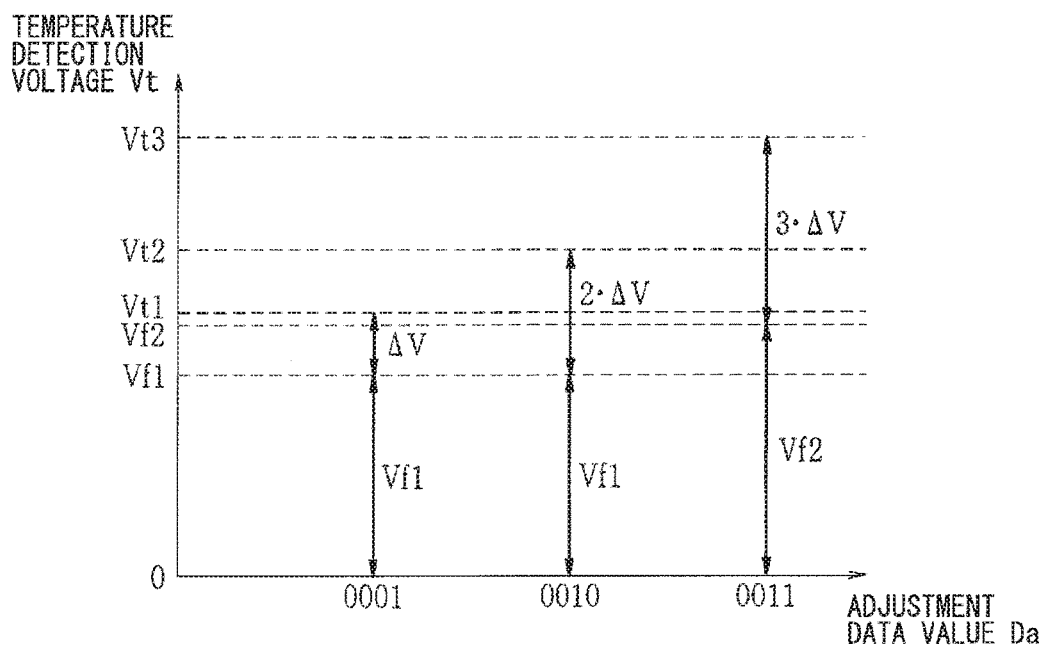
FIG. 6 is a diagram illustrating a variation of a temperature detection voltage according to an adjustment data value.

As shown in FIG. 5, the forward voltage Vf of the diode 14 increases as the forward electric current increases. The forward voltages when the electric currents of I and 2I flow are referred to as Vf1 and Vf2 (Vf1<Vf2). The temperature detection voltages Vt1, Vt2 and Vt3 in the case where the adjustment data values are 0001, 0010 and 0011 are expressed as shown in formulas (3), (4) and (5). FIG. 6 illustrates a variation of the temperature detection voltage Vt according to the adjustment data value Da.

$Vt1=Vf1+\Delta V$ (3)

$Vt2=Vf1+2\cdot\Delta V$ (4)

$Vt3=Vf2+3\cdot\Delta V$ (5)

In the case where the temperature detection voltage Vt (actually, the duty cycle of the temperature detection signal Stmp) is adjusted by increasing the adjustment data value Da sequentially in the inspection process, a voltage variation of the temperature detection voltage Vt when the adjustment data value Da is switched from 0001 to 0010 is equal to the correction resolution $\Delta V$. A voltage variation of the temperature detection voltage Vt when the adjustment data value Da is switched from 0010 to 0011 is equal to $\Delta V$+ (Vf2−Vf1). That is, a rate of the voltage variation in the adjustment is increased by Vf2−Vf1. As a result, a substantial correction resolution increases and there is a possibility that a remaining error after the adjustment increases.

Each of the switch circuits SW0 to SW3 of the present embodiment has a function as the second switch circuit (current compensating circuit). Each of the switch circuits SW0 to SW3 connects between the corresponding one of the constant current circuits CC0 to CC3 and the common terminals Nc of the ladder network 23 while disconnecting between the corresponding one of the constant current circuits CC0 to CC3 and the corresponding one of the current terminals N0 to N3 of the ladder network 23. That is, an electric current that is discarded in a general D/A conversion circuit is returned to the diode 14. Therefore, the electric current flowing to the diode 14 is constant regardless of the adjustment data value Da.

Figure 7:
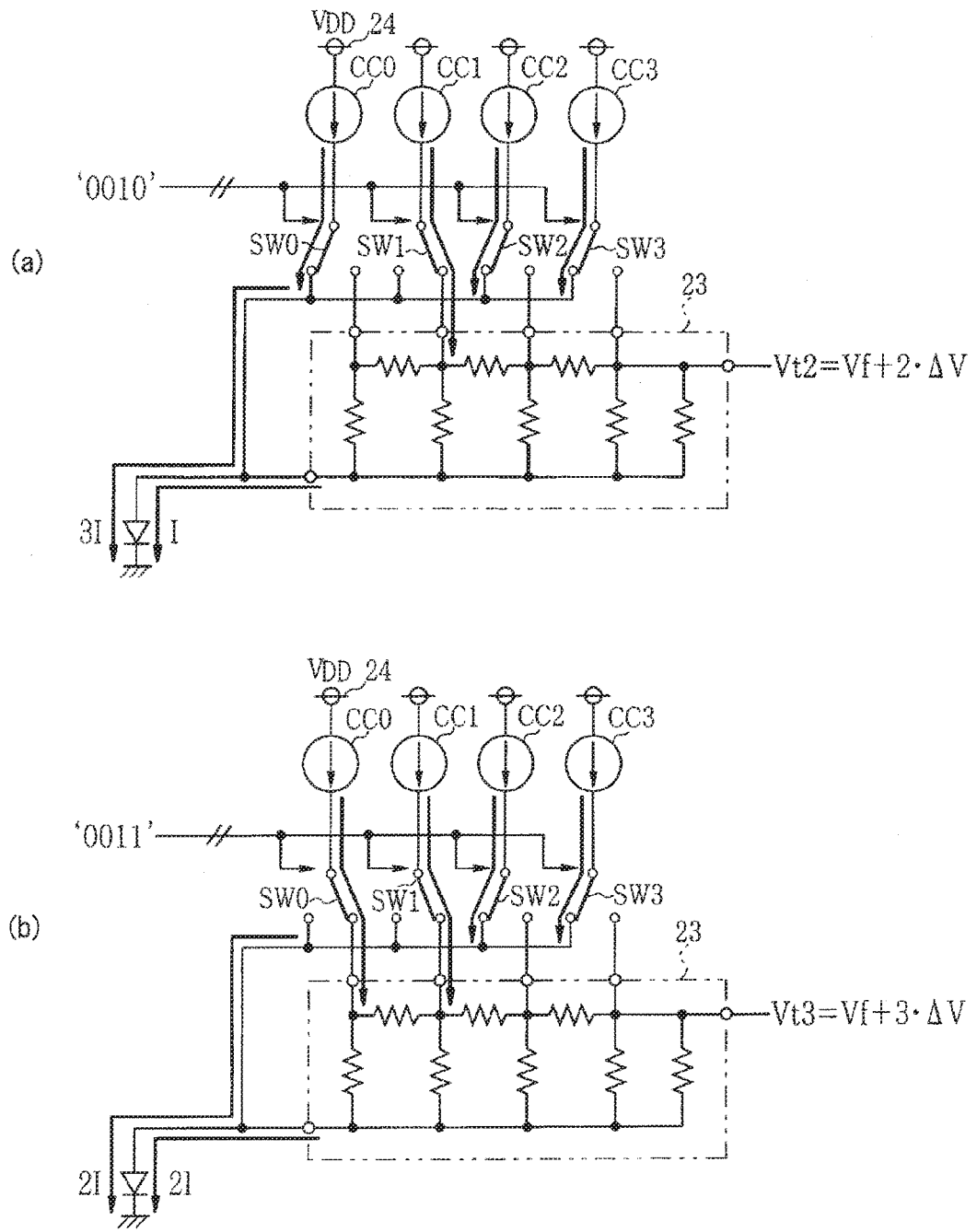
FIG. 7 is a diagram illustrating current paths in structures with second switch circuits.

In FIG. 7, (a) and (b) illustrate current paths in the case where the adjustment data value Da is 0010 and 0011. In the case where the adjustment data value Da is 0010, the electric current of 3I that does not contribute to the D/A conversion is returned to the diode 14 through the switch circuits SW0, SW2 and SW3, and the electric current of 4I flows to the diode 14. In the case where the adjustment data value Da is 0011, the electric current of 2I that does not contribute to the D/A conversion is returned to the diode 14 through the switch circuits SW2 and SW3, and the electric current of 4I flows to the diode 14. In this way, the forward voltage Vf of the diode 14 is constant regardless of the adjustment data value Da. As a result, the correction resolution $\Delta V$ is constant when the adjustment data value Da is increased or decreased by one bit at a time to adjust the temperature detection voltage Vt.

As described above, the temperature detection device 22 of the present embodiment adjusts the temperature detection voltage Vt at the threshold temperature to be in the prescribed range by adding the correction voltage Vc to the forward voltage Vf of the diode 14. As such, the accuracy of the temperature detection and operation accuracy of the protecting operation of the microcomputer can be improved.

The temperature detection voltage Vt is converted to the temperature detection signal Stmp and transmitted to the microcomputer. Therefore, the actual adjustment is performed based on the duty cycle of the temperature detection signal Stmp instead of the temperature detection voltage Vt. In this case, the duty cycle of the temperature detection signal Stmp can be adjusted to be in the prescribed range while including factors of error such as an amplitude error of the triangle wave voltage Vs and an offset voltage of the comparator 21 in addition to the variation of the forward voltage Vf of the diode 14.

The correction voltage Vc is the D/A conversion voltage of the adjustment data value Da outputted from the voltage adjusting circuit 19. Therefore, the correction voltage Vc can be set with the resolution of the D/A conversion circuit (voltage per one LSB). The temperature detection device 22 has the current compensating circuit that controls the electric current flowing to the diode 14 to be constant regardless of the adjustment data value Da. As such, the forward voltage Vt of the diode 14 is constant regardless of the adjustment data value Da. As a result, the correction resolution $\Delta V$ is constant. Therefore, the variation of the rate of the adjustment according to the adjustment data value Da can be restricted and the remaining error after the adjustment can be equally decreased.

Each of the switch circuits SW0 to SW3 has the function of the first switch circuit providing the D/A conversion circuit and the function of the second switch circuit providing the current compensating circuit. Since the number of signal lines that are needed to control the first switch circuit and the second switch circuit can be reduced, the structure can be simplified.

Second Embodiment

Figure 8:
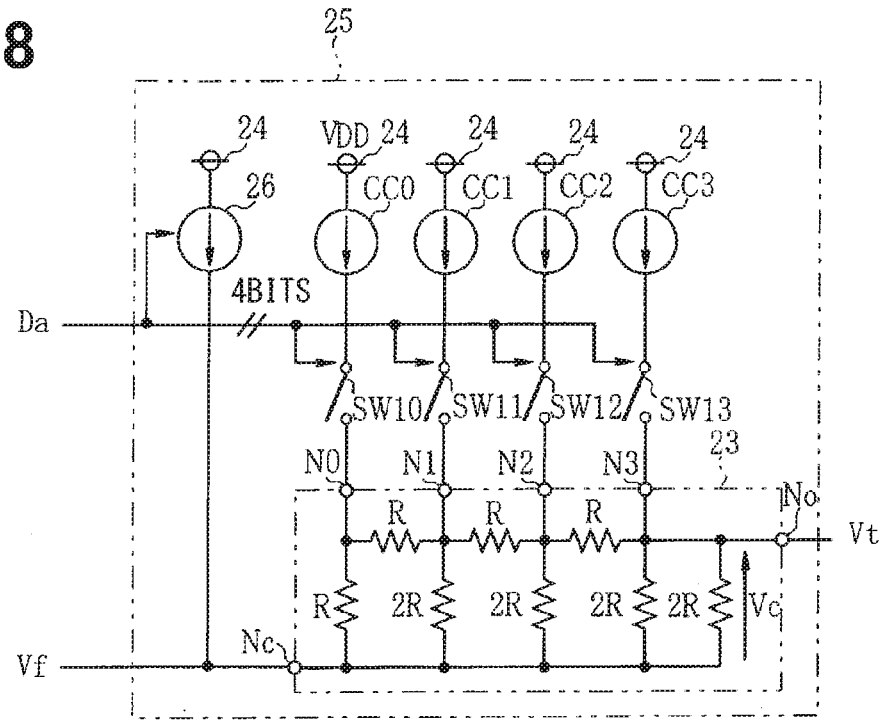
FIG. 8 is a diagram illustrating a structure of a correction voltage generating circuit of a temperature detection device according to a second embodiment of the present disclosure.

Second embodiment will be described with reference to FIG. 8. In the present embodiment, the correction voltage generating circuit 18 is replaced by a correction voltage generating circuit 25 in the structure shown in FIG. 2. The correction voltage generating circuit 25 has first switch circuits SW10 to SW13 instead of the switch circuits SW0 to SW3, compared to the correction voltage generating circuit 18 shown in FIG. 1. The correction voltage generating circuit 25 further has a variable current circuit 26 as a variable power source.

The variable current circuit 26 is a current compensating circuit that allows an electric current to flow into the diode 14, the electric current having a current value equal to the sum of values of electric currents outputted from the constant current circuits that correspond to the bits the switch circuits of which are off. For example, in the case where the adjustment data value Da is 0001 or 0010, the variable current circuit 26 outputs the electric current of 3I. In the case where the adjustment data value Da is 0011, the variable current circuit 26 outputs the electric current of 2I. In the case where the adjustment data value Da is 0111, the variable current circuit 26 outputs the electric current of I.

The output currents of the constant current circuits that correspond to the bits the bit value of which are 1 (switch circuit is on) flow to the diode 14 through the ladder network 23. The sum of the output currents of the constant current circuits that correspond to the bits the bit value of which are 0 (switch circuit is off) flow from the variable current circuit 26 to the diode 14. Also in the present embodiment, the electric current flowing to the diode 14 is constant regardless of the adjustment data value Da. Therefore, similar operations and effects to the first embodiment can be achieved.

Third Embodiment

Figure 9:
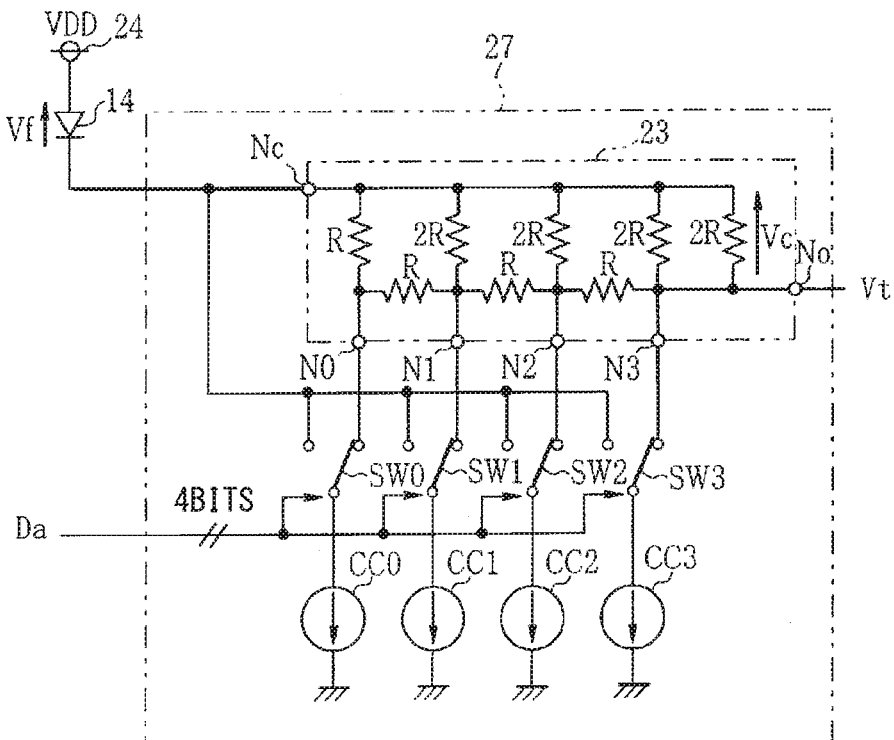
FIG. 9 is a diagram illustrating a structure of a correction voltage generating circuit of a temperature detection device according to a third embodiment of the present disclosure.

Third embodiment will be described with reference to FIG. 9. The diode 14 integrated in the IGBT module 11 is connected between the power line 24 (reference voltage line) and the common terminal Nc of the ladder network 23. A correction voltage generating circuit 27 has the ladder network 23, the constant current circuits CC0 to CC3 and the switch circuits SW0 to SW3, similar to the correction voltage generating circuit 18 shown in FIG. 1. Each of the constant current circuits CC0 to CC3 has one end connected to the ground.

According to the adjustment data value Da, the correction voltage generating circuit 27 allows the electric current to flow from the diode 14 to the constant current circuits CC0 to CC3 through the ladder network 23 and the switch circuits SW0 to SW3, or from the diode 14 to the constant current circuits CC0 to CC3 through the switch circuits SW0 to SW3. A direction of the electric current in the correction voltage generating circuit 27 is opposite to a direction of the electric current in the correction voltage generating circuit 18.

The present embodiment has a substantially same structure as the first embodiment and similar operations and effects to the first embodiment can be achieved.

Fourth to Seventh Embodiments

Fourth to seventh embodiments will be described with reference to FIG. 10 to FIG. 13. In the fourth to seventh embodiments, as the temperature sensing circuit, a series circuit of diodes 14a, 14b and 14c, a resistor 28 having a temperature characteristic (for example, base resistor), a voltage source 29 having a temperature characteristic, and a series circuit of the diode 14 and a voltage source 30 are used, respectively. When the voltage source 30 outputs a constant voltage Va that does not have a temperature characteristic, a cathode of the voltage source 30 can be regarded as the reference voltage line having the reference voltage Va.

Figure 10:
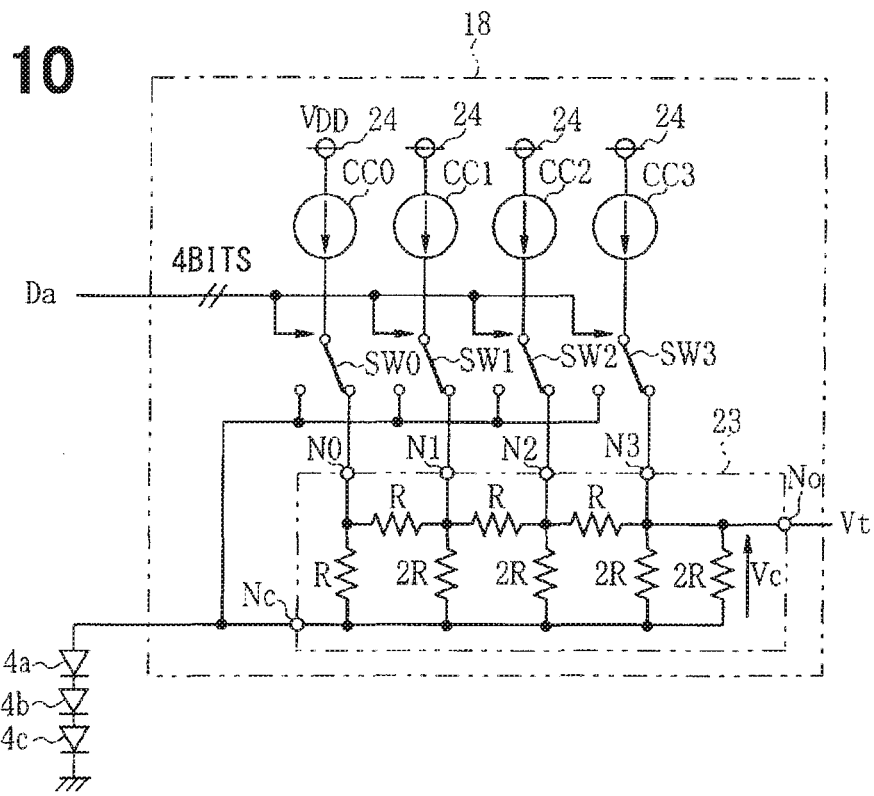
FIG. 10 is a diagram illustrating a structure of a correction voltage generating circuit of a temperature detection device according to a fourth embodiment of the present disclosure.
Figure 11:
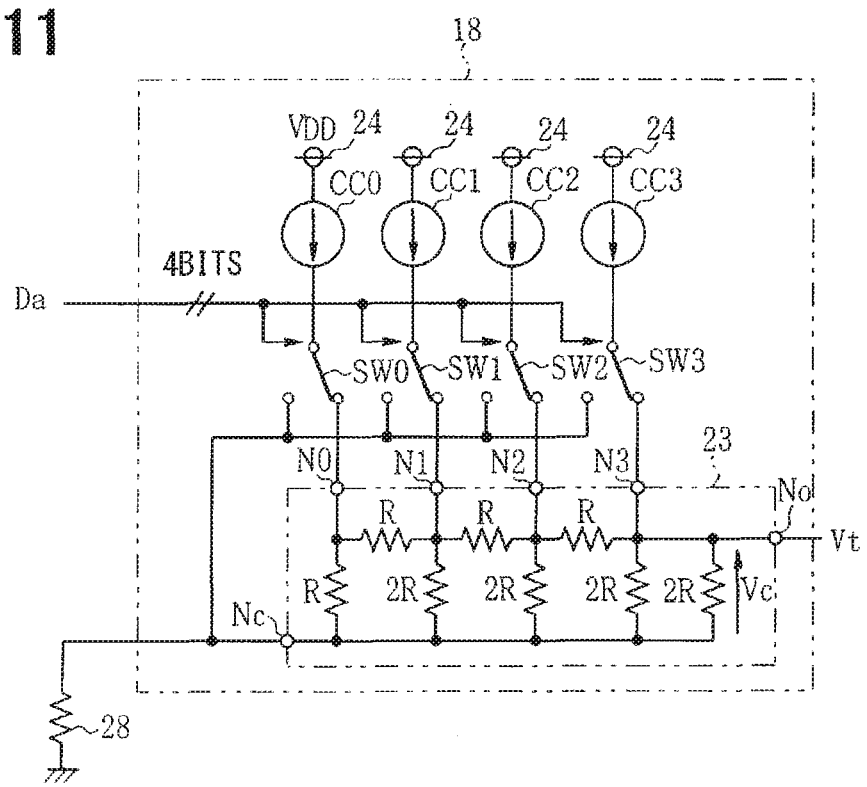
FIG. 11 is a diagram illustrating a structure of a correction voltage generating circuit of a temperature detection device according to a fifth embodiment of the present disclosure.
Figure 12:
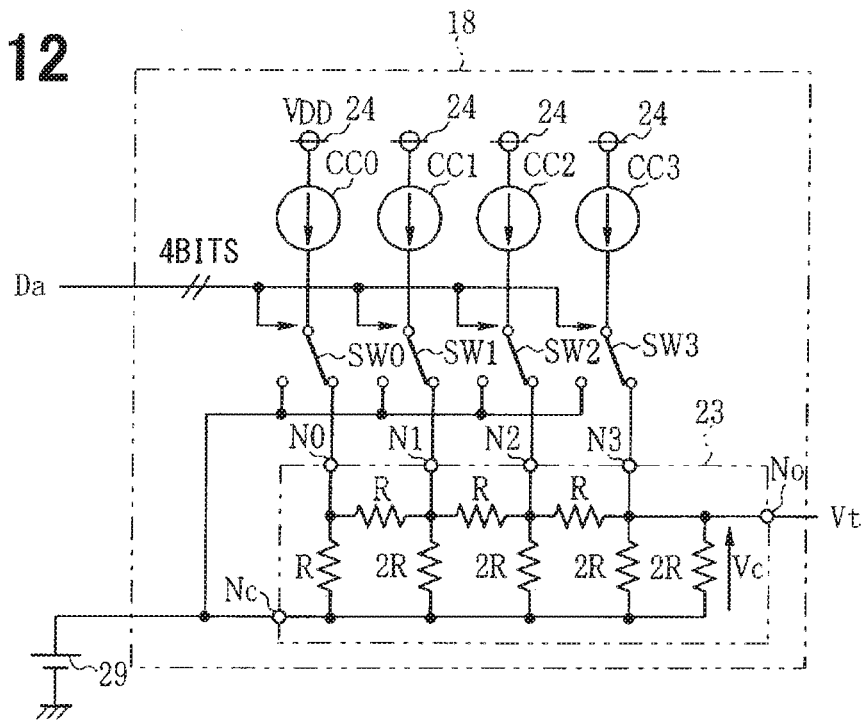
FIG. 12 is a diagram illustrating a structure of a correction voltage generating circuit of a temperature detection device according to a sixth embodiment of the present disclosure.
Figure 13:
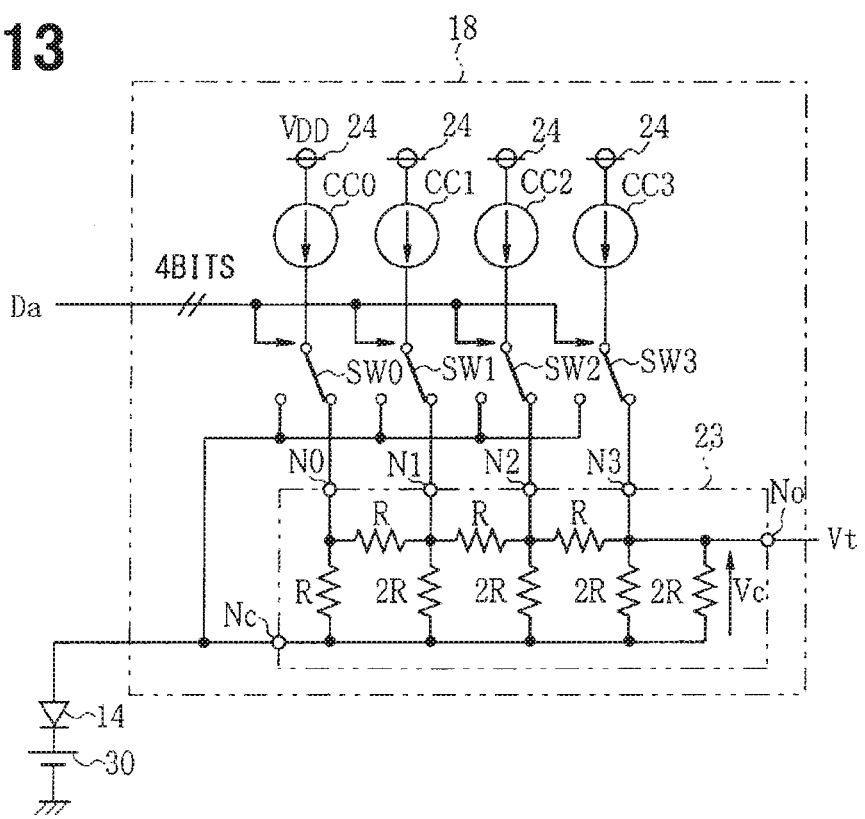
FIG. 13 is a diagram illustrating a structure of a correction voltage generating circuit of a temperature detection device according to a seventh embodiment of the present disclosure.

As shown in FIG. 10, when the series circuit of the diodes 14a, 14b and 14c is used, the temperature detection voltage Vt increases. As a result, a range of a voltage inputted to the comparator 21 is optimized and a comparing operation can be performed with a high gain. Similar effects can be achieved also in a structure shown in FIG. 13. Similar operations and effects to the first embodiment can be achieved in the fourth to seventh embodiments.

Other Embodiments

While only the selected exemplary embodiments of the present disclosure have been described hereinabove, the present disclosure is not limited to the embodiments. Various changes and modifications can be made without departing from the gist of the present disclosure.

In the above embodiments, when the variation of the voltage (temperature sensing voltage) of the temperature sensing circuit occurring due to the variation of the electric current is small and the temperature detection error is in the prescribed range regardless of the adjustment data value Da, the current compensating circuit (the second switch circuit, the variable current circuit 26) may be omitted.

The temperature sensing circuit may include one element or a series circuit of plural elements selected from one diode or series connected diodes each having a temperature characteristic, one resistor or series connected resistors each having a temperature characteristic and one voltage source or series connected voltage sources each having a temperature characteristic. For example, the temperature sensing circuit may be a series circuit of the diode 14 and the voltage source 29. The temperature sensing circuit may not be integrated in the IGBT module 11.

The voltage adjusting circuit 19 is not limited to a non-volatile memory, but my be any non-volatile circuit element.

The triangle wave generating circuit 20 and the comparator 21 may be provided as necessary.

The ladder network 23 is not limited to a 4 bits configuration.

The invention claimed is:
1. A temperature detection device comprising:
a ladder network that includes an R-2R type resistor ladder provided between current terminals correspondingly provided for bits and a common terminal provided for the bits in common, and generates a voltage between an output terminal of the R-2R type resistor ladder and the common terminal when electric currents are inputted or outputted through the current terminals, the voltage being obtained by weighting a bit value of each of the bits with power of two and adding the bit values weighted;
a plurality of constant current circuits that are correspondingly provided for the bits;
a plurality of first switch circuits that are correspondingly provided for the bits between the constant current circuits and the current terminals of the ladder network;
a temperature sensing circuit that is provided between the common terminal of the ladder network and a reference voltage line having a reference potential, and outputs a voltage according to a temperature; and a voltage adjusting circuit that outputs an adjustment data value commanding on and off states of the first switch circuits such that a voltage generated between the output terminal of the ladder network and the reference voltage line when the temperature sensing circuit is at a predetermined temperature is in a prescribed voltage range.

2. The temperature detection device according to claim 1, wherein
the temperature sensing circuit includes one element or a series circuit of plural elements selected from one diode or series connected diodes each having a temperature characteristic, one resistor or series connected resistors each having a temperature characteristic, and one voltage source or series connected voltage sources each having a temperature characteristic.

3. The temperature detection device according to claim 1, further comprising:
a current compensating circuit that controls an electric current flowing to the temperature sensing circuit to be constant regardless of the adjustment data value.

4. The temperature detection device according to claim 3, wherein
the current compensating circuit includes a variable current source that allows an electric current to flow into the temperature sensing circuit, the electric current having a current value equal to a sum of values of electric currents outputted from the constant current circuits that correspond to the bits the first switch circuits of which are off.

5. The temperature detection device according to claim 3, wherein
the current compensating circuit includes a plurality of second switch circuits that are correspondingly provided for the bits,
each of the second switch circuits connects between corresponding one of the constant current circuits and the common terminal of the ladder network while corresponding one of the first switch circuits disconnects between the corresponding one of the constant current circuits and corresponding one of the current terminals of the ladder network, and
each of the second switch circuits disconnects between the corresponding one of the constant current circuits and the common terminal of the ladder network while the corresponding one of the first switch circuits connects between the corresponding one of the constant current circuits and the corresponding one of the current terminals of the ladder network.

6. The temperature detection device according to claim 5, wherein
each of the first switch circuits and each of the second switch circuits are provided by an integrated switch circuit, and
the integrated switch circuit connects the corresponding one of the constant current circuits to either the corresponding one of the current terminals of the ladder network or the common terminal of the ladder network according to a bit value of corresponding one of the bits of the adjustment data value.

* * * * *